April 5, 1938.  F. ZAGELMEYER  2,113,262
SURGE BRAKE COUPLER
Filed Jan. 15, 1937  2 Sheets-Sheet 2
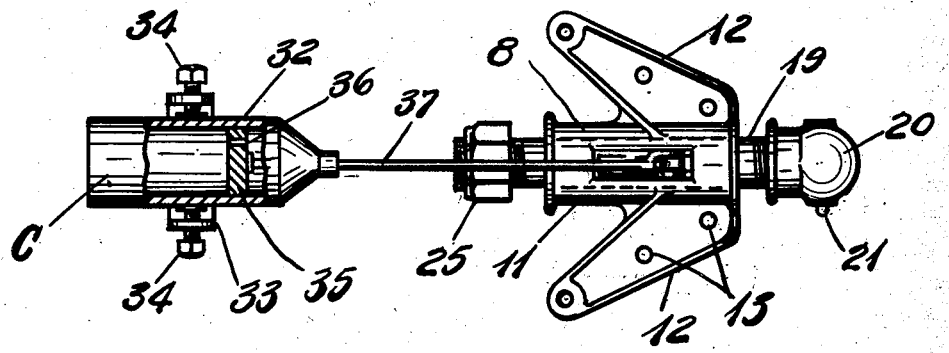
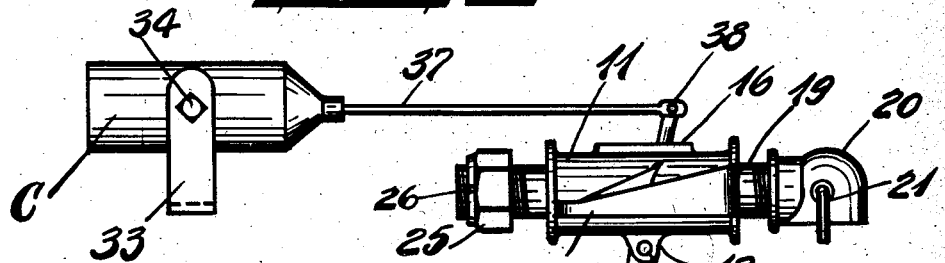
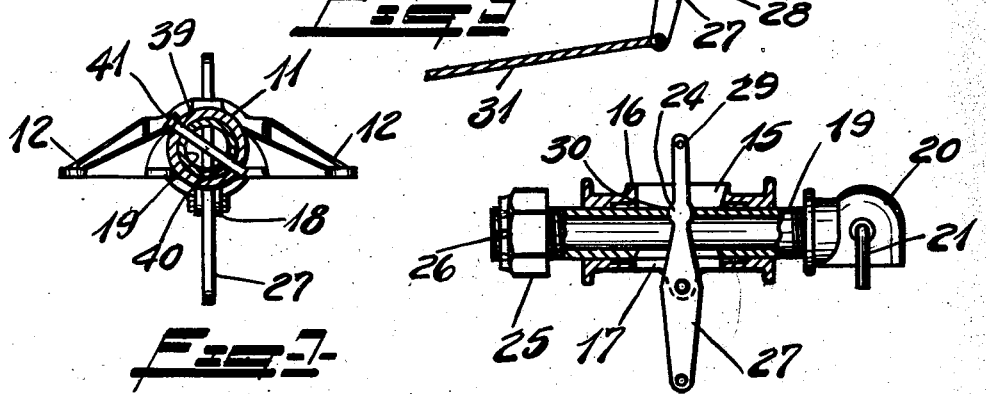
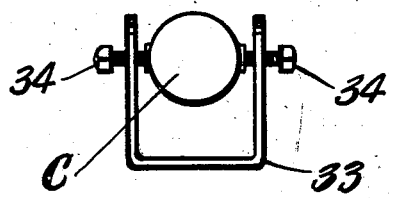
INVENTOR.
Frank Zagelmeyer
BY Frank C. Earman
ATTORNEY.

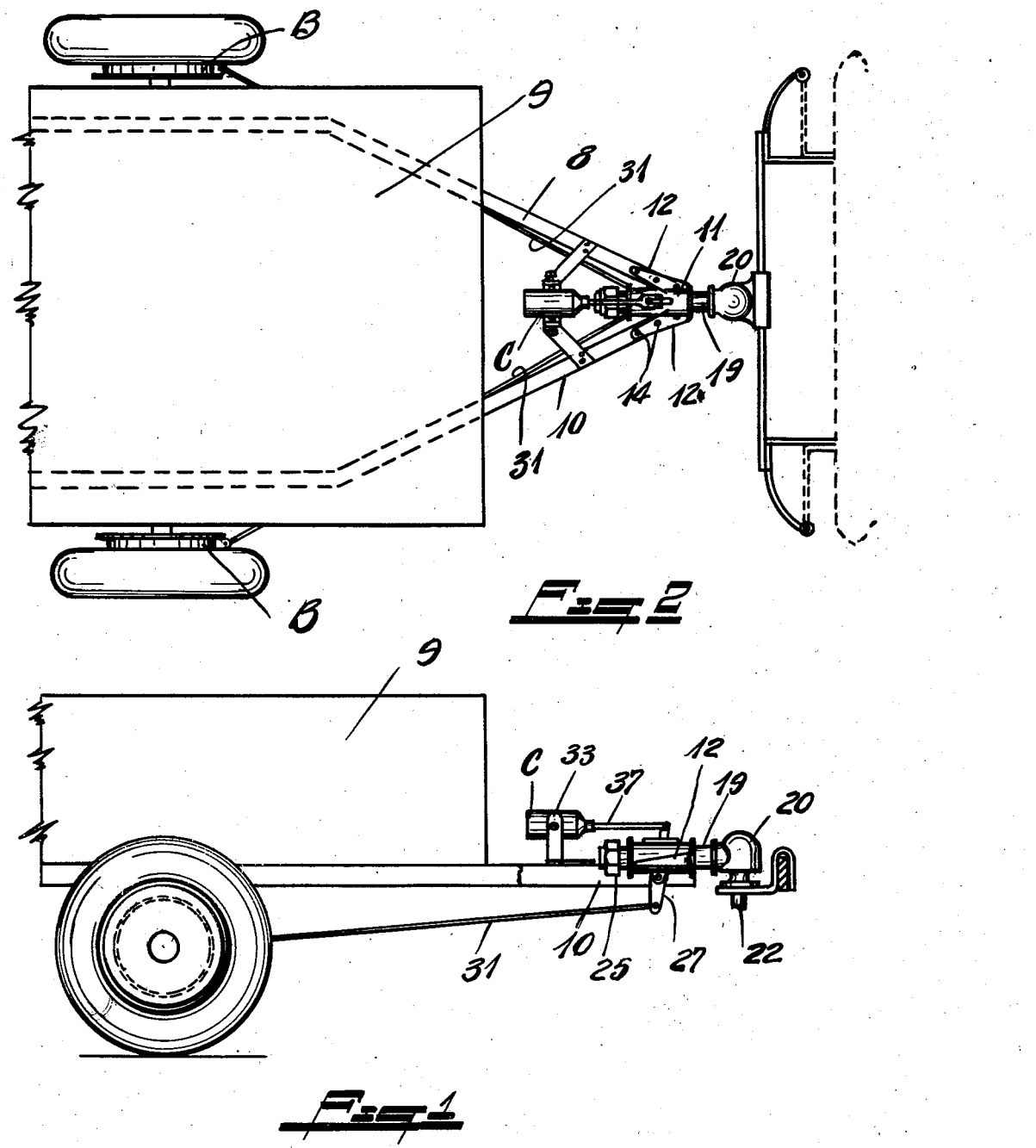

Patented Apr. 5, 1938

2,113,262

UNITED STATES PATENT OFFICE 2,113,262

SURGE BRAKE COUPLER

Frank Zagelmeyer, Bay City, Mich.

Application January 15, 1937, Serial No. 120,711

1 Claim. (Cl. 188—142)

This invention relates to a combination coupling and brake actuating mechanism, and more specifically to a mechanism designed to automatically apply the brakes on a trailer when going downhill; if the towing or power vehicle should stop; or when for any reason the trailer "surges" and tends to exert a pushing force against the towing vehicle.

One of the prime objects of the invention is to design a mechanism which will be entirely automatic in its operation in applying and releasing the trailer brakes without attention from the driver of the towing or power vehicle, and which will cushion the application or release, so as to prevent chattering, or jerky operation.

Another object is to provide a very simple, practical, substantial, and effective brake actuating means, associated with the coupling, and in such manner that when the brakes are applied on the power vehicle, the momentum of the trailer vehicle will operate the trailer brakes, such application and release of the trailer brakes being instantly responsive to all movements of the power vehicle and smoothly responsive to the suddenness of such movement.

A still further object is to provide means for disconnecting the brake actuating mechanism so as to render it inoperative when desired and without in any manner affecting the normal function or operation of the coupling.

A further important object still is to provide cushioning means associated with the brake actuating means to cushion the application and release of the brakes, so that the action will be smooth and velvety and eliminate the sudden jerky motion and/or jolts caused by harsh brake application or release.

With the above and other objects in view, the present invention consists in the combination and arrangement of parts, hereinafter more fully described, illustrated in the accompanying drawings, and more particularly pointed out in the appended claim, it being understood that changes may be made in the form, size, proportions and minor details of construction without departing from the spirit or sacrificing any of the advantages of the invention.

In the drawings—

Fig. 1 is a fragmentary side elevational view of a trailer showing my surge brake coupler mounted thereon.

Fig. 2 is a top plan view showing the coupler attached to the bumper of a towing vehicle.

Fig. 3 is an enlarged side elevational view of my surge brake coupler.

Fig. 4 is a part sectional top plan view, the wall of the cushioning means being broken away to show the interior.

Fig. 5 is a part sectional view of the coupler.

Fig. 6 is an end view of the cushioning means, and

Fig. 7 is a fragmentary sectional end view of the coupler showing the sleeve and draw-bar locked together.

By reference to the accompanying drawings, it will be noted that I have not attempted to show any specific style or type of power vehicle, nor have I attempted to show a particular type or form of trailer, because this mechanism is adaptable to any two or more interconnected vehicles which travel in tandem.

Referring now to the drawings, the numeral 8 denotes a preferably V-shaped trailer tongue which projects from the trailer 9, and on which the interconnecting mechanism is mounted, and in the present instance I have shown this tongue formed of angle iron 10 to provide a rigid substantial construction, the converging ends being secured together in any approved manner.

The coupling proper comprises a preferably cast shell or sleeve 11 formed as clearly shown in Figs. 3 and 4 of the drawings, outwardly diverging wings 12 being cast integral with the shell and are provided with spaced apart openings 13 to accommodate bolts 14, so that the member may be rigidly secured on the trailer tongue.

A slotted opening 15 is provided in the upper wall of the shell and a rim 16 surrounds said opening, a similar opening 17 being provided in the lower wall, and ears 18 depend from the shell on opposite sides of said opening and for a purpose to be presently described.

A tubular draw-bar 19 is slidably mounted in the hollow shell or sleeve 11 and is preferably hollow as shown, a ball socket 20 being provided on one end of said draw-bar, and a transversely disposed pin 21 projects through said ball socket and through the head of the ball bolt 22, all as shown and described in my application for Letters Patent filed October 19, 1935, Serial No. 45,756.

A slotted opening 23 is provided in the draw-bar 19 at a point intermediate its length, the ends being rounded as at 24, and when the draw-bar is assembled in the shell, these openings 15, 17, and 23 will be in vertical alignment. The end of the draw-bar 19 is threaded as shown, and a nut 25 is threaded thereon, a cotter pin 26 serving to prevent accidental unscrewing of the nut.

A brake lever 27 is pivotally mounted on the ears 18 by means of the bolt 28, the upper end of said lever projecting through the draw-bar and shell and having an opening 29 provided in the upper end thereof, the section 30 of said lever being rounded to provide rolling contact with the rounded ends 24 of the slot 23 when the draw-bar moves with relation to the shell, the lower end of the lever depending below the ears 18, the brake rods or cables 31 are anchored thereto and lead to the trailer brakes "B" for operation thereof when the brake lever is actuated.

A cushioning mechanism "C" is provided on the trailer tongue 8 and comprises a cylinder 32, a saddle 33 being mounted on said tongue, said cylinder being pivotally mounted in said saddle by means of the set screws 34. Oil or other suitable fluid is provided in this cylinder 32, and a piston 35 is reciprocatingly mounted therein and is provided with an opening or by pass 36 to permit the liquid to by pass from one side of the piston to the other. A piston rod 37 is connected to said piston, the opposite end of said rod being connected to the upper end of the brake lever 27 by means of the bolt 38, consequently, when the power vehicle has to slow up or come to a stop, the momentum of the trailer causes the draw-bar to slide rearwardly in the shell 11, this rocks the brake lever 27 on the pin 28, so that the piston rod 37 forces the piston rearwardly in the cylinder and the lower end of the brake lever swings forwardly and applies the trailer brakes, and this movement is controlled and cushioned by the piston 35, the size of the opening 36 regulating and controlling the piston travel, then when the towing action is resumed, the draw-bar 19 slides forwardly in the shell, and the piston 35 is drawn toward the front end of the cylinder, forcing the fluid back through the piston opening 36 and cushioning the brake release as well as shocks in the coupler proper.

In a cushioning means as above described, it is of prime importance that there be no counteracting force built up by the piston movement as would occur if springs or other resilient material were used, and which would when actuated, tend to force the piston back to its original position, as it is necessary that the brakes be smoothly applied and that they remain in set position until released by movement of the draw-bar, release must also be smooth, otherwise the nut 25 would hammer against the end of the sleeve when the towing vehicle starts, and the hydraulic mechanism as herein described accomplishes this in a very satisfactory manner.

The mechanism is also designed to operate independently of the cushioning and brake mechanism, openings 39 and 40 being provided in the sleeve and draw-bar respectively, and when brakes are not required or desired, the operator merely inserts a pin 41 in the openings 39 and 40 and the draw-bar and shell will then be locked rigidly together.

Although only one form of the invention has been described and illustrated, it will be apparent to those skilled in the art that various modifications may be made in the specific mechanism, and that air may be used instead of fluid without departing from the scope of the appended claim.

From the foregoing description it will be obvious that I have perfected a very simple, practical and effective coupling and brake actuating means.

What I claim is:

In combination with a power vehicle and a trailer having brakes, means interconnecting said vehicle and trailer and comprising a sleeve mounted on the trailer, a draw-bar mounted for limited longitudinal movement therein, and having a ball socket threaded on one end thereof, a nut on the opposite end, aligned, slotted openings in the sleeve and draw-bar respectively, a hydraulic cushioning mechanism mounted on the trailer, and a brake lever pivotally mounted on the sleeve with one end connected to the trailer brakes and the opposite end connected to the cushioning mechanism for regulating the brake application and/or release when the draw-bar moves in the sleeve.

FRANK ZAGELMEYER.